United States Patent
Singh

(10) Patent No.: US 7,652,440 B2
(45) Date of Patent: Jan. 26, 2010

(54) SWITCHING SYSTEM FOR CONTROLLING THE STARTING OF AN ELECTRICAL MOTOR

(76) Inventor: Abhishek Singh, House No. 685, Sector 7B, Faribabad, Haryana (IN)

( * ) Notice: Subject to any disclaimer, the term of this patent is extended or adjusted under 35 U.S.C. 154(b) by 224 days.

(21) Appl. No.: 11/916,970

(22) PCT Filed: Jun. 8, 2006

(86) PCT No.: PCT/IN2006/000194

§ 371 (c)(1),
(2), (4) Date: Dec. 7, 2007

(87) PCT Pub. No.: WO2006/131937

PCT Pub. Date: Dec. 14, 2006

(65) Prior Publication Data

US 2009/0128082 A1     May 21, 2009

(30) Foreign Application Priority Data

Jun. 9, 2005   (IN) ......................... 1490/DEL/2005

(51) Int. Cl.
*H02P 6/04* (2006.01)
(52) U.S. Cl. ........................... 318/400.11; 318/400.35; 318/400.41; 318/817; 318/727; 318/738
(58) Field of Classification Search ............ 318/400.11, 318/727, 400.41, 400.35, 817, 738, 701
See application file for complete search history.

(56) References Cited

U.S. PATENT DOCUMENTS

| | | | |
|---|---|---|---|
| 3,414,789 A | 12/1968 | Prouty | |
| 3,671,830 A | 6/1972 | Kruper | |
| 4,167,693 A * | 9/1979 | Liska et al. | 318/400.01 |
| 4,390,825 A * | 6/1983 | Ginn | 388/847 |
| 4,481,786 A * | 11/1984 | Bashark | 62/160 |
| 4,496,895 A | 1/1985 | Kawate et al. | |
| 4,622,506 A | 11/1986 | Shemanske et al. | |
| 4,670,697 A | 6/1987 | Wrege et al. | |
| 5,237,256 A * | 8/1993 | Bashark | 318/817 |
| 5,296,795 A | 3/1994 | Dropps et al. | |
| 6,051,952 A * | 4/2000 | Moreira et al. | 318/738 |
| 6,756,756 B1 | 6/2004 | Chmiel et al. | |

* cited by examiner

*Primary Examiner*—Rita Leykin
(74) *Attorney, Agent, or Firm*—Banner & Witcoff, Ltd.

(57) ABSTRACT

A low cost switching system for an electrical motor, which is speed sensitive, direction of rotation insensitive, load insensitive and voltage fluctuation insensitive. The switch contains a power supply, a control circuit, a zero cross detector circuit, a triggering circuit and an electronic switch to provide the switching action. A time delay hysteresis inducement circuit is provided in the switching system to energized and deenergized the capacitor at a predetermined synchronous speed of the motor. The switching system first checks the speed of the motor before reenergizing the start capacitor, which increases the life of the motor. The switching system operates in high temperature range and regardless the value of the capacitor used.

12 Claims, 2 Drawing Sheets

SWITCHING SYSTEM FOR CONTROLLING THE STARTING OF AN ELECTRICAL MOTOR

This application is a national stage application of co-pending PCT application PCT/IN2006/000194 filed Jun. 8, 2006 which claims priority of Indian Application No. 1490Del/2005, filed Jun. 9, 2005. The disclosure is expressly incorporated herein by reference.

FIELD OF THE INVENTION

The present invention relates to a switching system for controlling the starting of an electrical motor. More particularly this invention relates to a switching system for a single-phase induction motor.

BACKGROUND OF THE INVENTION

A single-phase motor uses a start capacitor to start the motor. The start capacitor and the auxiliary winding are capable of only intermittent use. The single-phase motors use a switch to disconnect the current to the capacitor once approximately 75% of the motor's synchronous speed is reached. In the art, a mechanical switch achieves this.

Mechanical switches operate on the centrifugal principle. The switch opens up at a predetermined speed, which is required to initiate centrifugal action, and then detaches the capacitor from the motor circuit thereby closing the power supply thereto. When switch falls below the predetermined speed, the switch closes (centrifuge action) attaching the capacitor to the circuit. The mechanical switch therefore attaches and detaches the capacitor for capacitor start motor.

Single-phase motors typically require the inclusion of start winding to cause the main winding in the motor to produce magnetic fields having a rotational character. Once started, the rotating rotor will itself give rise to induced magnetic fields such that a two-pole run winding is capable maintaining the rotation of the rotor. The start winding is energized for only a short period of time following start-up to permit the motor to be brought up to operating speed and which is thereafter de-energized.

Prior known electronic switch measure voltage or current flow through the start winding to determine switching from the start winding to the run winding.

The utilization of solid state switches for motor starting to improve reliability and longevity over conventional electro-mechanical relay is well known.

A solid-state switch provides an alternate solution for capacitor connection and disconnection, to the mechanical switch with vital added advantages.

The basic principle of operation for a solid state switch for a single phase induction motor having a main and auxiliary winding is based on the principle that a 90° out of phase voltage is induced in the auxiliary winding whose amplitude is proportional to the speed of the motor and is almost equal to the mains voltage at synchronous speed, that means phase angle between mains voltage (M) and vector sum of auxiliary and mains voltage will almost equal be equal to zero at zero speed and almost equal to 45° at a synchronous speed.

Supply to the auxiliary winding is provided through the 'solid state switch'. Solid-state switch disconnects the auxiliary winding supply when this angle reaches 36°. Also the solid-state switch reconnects the auxiliary winding supply if this phase vector angle is less than 18°. This solid-state switch to perform switching action of capacitor current senses the phase angle continuously.

Unlike mechanical switch, solid-state switch varies only with frequency of AC supply, thus the same solid-state switch can be used for different speed motors. However, in this case of mechanical switches, different speed motors require different mechanical switches. Another advantage of solid state switches is that they can be mounted anywhere including outside the motor or even distant from the motor. Mechanical switches on the other hand have to be mounted on the motor shaft, thereby increasing the size of the motor.

The conventional solid state switch sense current by a current sensor through the main winding and then actuate the disconnect switch at a designated condition. This approach may be objectionable due to the extra wattage and heat because current is still flowing through the sensor in the run mode after starting.

To overcome the above mentioned limitation U.S. Pat. No. 4,622,506 provides a system for an electronic control system for an auxiliary winding disconnected switch which eliminate the need for extra component on the motor shaft or in series in the motor circuit. However, this system is load sensitive.

U.S. Pat. No. 3,414,789 and U.S. Pat. No. 3,671,830 switching system utilize one or more characteristic of the motor to prevent conduction of the triac and hence effect deenergization of the start winding at the optimum moment. However, variation in voltage supply and loading effect the motor speed at which the start winding is deenergized resulting in inconsistent performance.

U.S. Pat. No. 4,496,895 provides a motor starter which can be used with both split-phase and capacitor start motors and which can be used with a whole class of motors without any need for tailoring to a specific application. This motor starter has a positive lockout capability to prevent reenergization of the start winding until the motor is deenergized. However, the pulse transformer used in this system is very expensive which makes the switch costly.

U.S. Pat. No. 4,670,697 provides a low cost switch for use with the start or auxiliary winding of a single phase AC induction motor. However, this switch is load sensitive.

U.S. Pat. No. 6,756,756 provides a simple, low cost motor starting controller that is speed sensitive and AC line voltage insensitive. However, the switch is load sensitive and it does not check the sped of the motor before reenergization.

OBJECT AND SUMMARY OF THE INVENTION

It is an object of the present invention to provide a switching system for controlling the starting of an electrical motor regardless the value of the capacitor used.

It is another object of the present invention to provide a switching system to operate over a wide voltage range.

It is yet another object of the present invention to provide a switching system, which is independent of synchronous speed of the motor and said switch can be used for different electrical motor irrespective of speed.

It is a further object of the invention is to increase the life of the start capacitor.

It is an additional object of the invention to reduce the size of the electrical motor by mounting said switching system at any place in the electrical motor.

To achieve the aforementioned objectives and sort out the limitation of the prior arts, the present invention provide a switching system for controlling the starting of an electrical motor comprising:

a first winding subsystem for generating a first voltage signal;

a second winding subsystem for generating a second voltage signal and getting deactivated after the attainment of starting speed by said electrical motor;

a first control means receiving said first and second voltage signal for computing the resultant of said first and second voltage signal to thereby produce at least two pulse signals corresponding to said resultant and to generate a first enabling signal to incorporate a delay in deactivation of said second winding subsystem, said delay corresponding to the configuration of said first control means;

a charge storage means coupled to said second winding subsystem responsive to the additional phase shift generated by second winding subsystem;

a signal detection means for generating a second enabling signal;

a second control means for generating an output signal responsive to said first and second enabling signals;

a third control means coupled to said second control means for generating a triggering signal;

a triggering means coupled to said third control means for triggering a regulating device to thereby generate an output for facilitating the commencement and completion of the start operation of said electrical motor;

a time delayed hysteresis inducement means responsive to the output signal for establishing a threshold value corresponding to the commencement and completion of the start operation, aid threshold value being established to overcome redundancy caused due to hysteresis; and a power supply means coupled to said first winding subsystem for generating power for said switching system.

BRIEF DESCRIPTION OF THE ACCOMPANYING DRAWINGS

The invention will now be described in reference to the accompanying drawings.

DETAILED DESCRIPTION OF THE INVENTION

Figure 1:
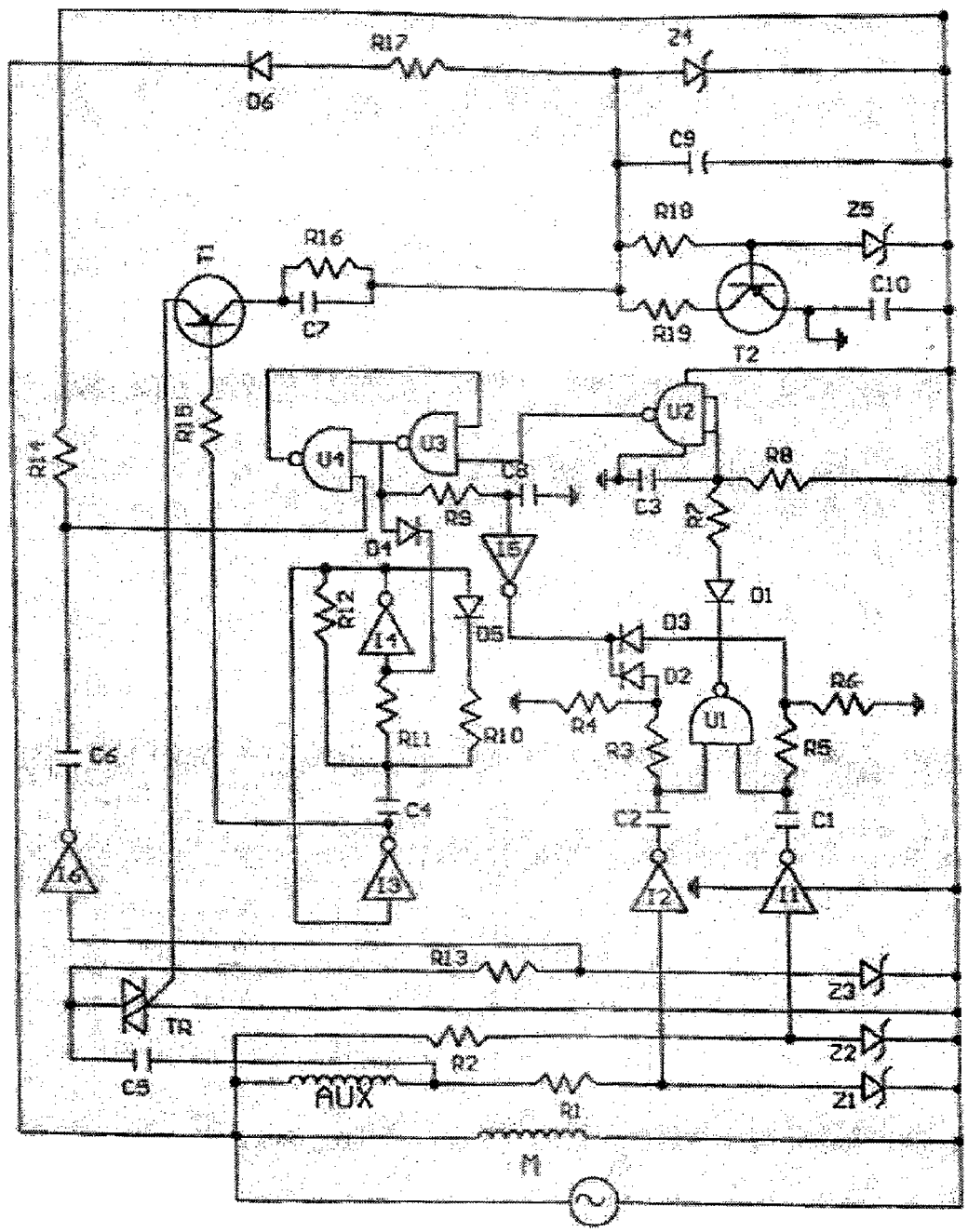
FIG. 1 illustrates a circuit diagram of a switching system for controlling the starting of an electrical motor according to the present invention.

Referring first to FIG. 1, there is shown a circuit diagram of a switching system for controlling the starting of an electrical motor according to the present invention.

The switching system comprising a first winding subsystem for generating a first voltage signal and a second winding subsystem for generating a second voltage signal.

The first winding subsystem is a main winding (M) of the single-phase induction motor, which comprising a resistor (R2) connected in series with a zenner diode (Z2) for generating a first voltage signal.

The second winding subsystem generated a second voltage signal which is the auxiliary sum of the first voltage signal and voltage signal generated by the auxiliary winding. The auxiliary winding (AUX) of the single-phase induction motor comprises a resistor (R1) connected in series with a zenner diode (Z1).

The main and auxiliary winding is connected to a first control means. The first control means received said first and second voltage signal for computing the resultant of said first and second voltage signal to thereby produce at least two pulse signals corresponding to said resultant The first control means comprising at least two inverters (I1 and I2) which are connected with at least two timing circuit (C2, R3 and C1, R5).

The first control means further comprising a logic gate (U1) for generating a first enabling signal responsive to the output of said two pulse signals. The output of said logic gate is connected to a control signal generation circuit. The control signal generation circuit comprises a diode (D1) and a resistor-capacitor circuit (C3 and R8). It incorporates a delay in deactivation of said second winding subsystem, said delay corresponding to the configuration of said first control means.

A charge storage means coupled to the second winding subsystem responsive to the additional phase shift generated by second winding subsystem. The storage means is a start capacitor (C5) coupled to the auxiliary winding.

The switching system comprising signal detection means for generating a second enabling signal. The signal detection means is a zero-crossing detector circuit comprising an inverter (16) and a capacitor (C6).

The switching system further comprising a second control means for generating an output signal responsive to said first and second enabling signals.

The second control means comprising a RS latch made of logic gate (U3 and U4).

The switching system further comprising a third control means for generating a pulse signal responsive to the output of said second control means.

The third control means is a free running oscillator made of I3, C4, I4, R11, R10, D5 and R12.

The switching system of the present invention also comprising a triggering means coupled to said third control means for triggering a regulating device to thereby generate an output for facilitating the commencement and completion of the start operation of said electrical motor.

The triggering means comprising a resistive-capacitive circuit (R16 and C7) and a transistor (T1) coupled to said resistive-capacitive circuit. The regulating device is a triac (TR), which fire through a firing circuit (R15, T1, C7, R16).

The switching system further comprises a time delayed hysteresis inducement means responsive to the output signal for establishing a threshold value corresponding to the commencement and completion of the start operation, aid threshold value being established to overcome redundancy caused due to hysteresis.

The time delayed hysteresis inducement means comprising a timing circuit (R9 and C8) and a logic gate inverter (15).

A power supply means coupled to first winding subsystem for generating power for said switching system.

The power supply means comprising a biasing circuit, a transistor (T2) coupled to said biasing circuit, a capacitor (C9) connected in parallel to said biasing circuit and a zener diode (Z4) connected in parallel to said capacitor (C9).

If pulses from I1 and I2 are high at the same time, the output of U1 goes low and discharges capacitor C3 through R7 and D1, which in turns resets RS latch made from U3 and U4 (output of U2 goes high). Once C3 is discharged it takes approximately 500 msec to charge through R8. Zero cross detector made from 16 and C6 delivers a short pulse of zero volt each time zero crossing occurs. Output of U3 goes low at zero cross and remains low till U2 sets it again (Output of U2 goes low). As output of U3 goes low, it releases free running oscillator (I3, C4, I4, R11, R10, D5, R12) and pulses are released at output of I3 which fires triac TR through firing circuit (R15, T1, C7, R16). Now the capacitor is connected and low pulses are no more released at the output of U1. The firing pulses are still released for approximately 500 msec (time constant of R8 and C3). After approx. 500 msec, output of U3 goes high stopping the firing pulses (even if motor has not reached 80% of rated speed). Output of 15 will not go low for 50 msec (because of R9, C8), capacitor is no more in the circuit (firing stopped). If the speed has not reached 80%, the low pulses will again generate at output of U1 (the output pulses are generated within 30 msec max), firing will again start and the cycle will repeated.

When speed has reached 80%, the complete cycle stop and also after 50 msec, the output of 15 will go low. Pulses of 0.5 sec will be generated at input of U1 and motor can restart only if its speed falls below 20% of the max speed.

Figure 2:
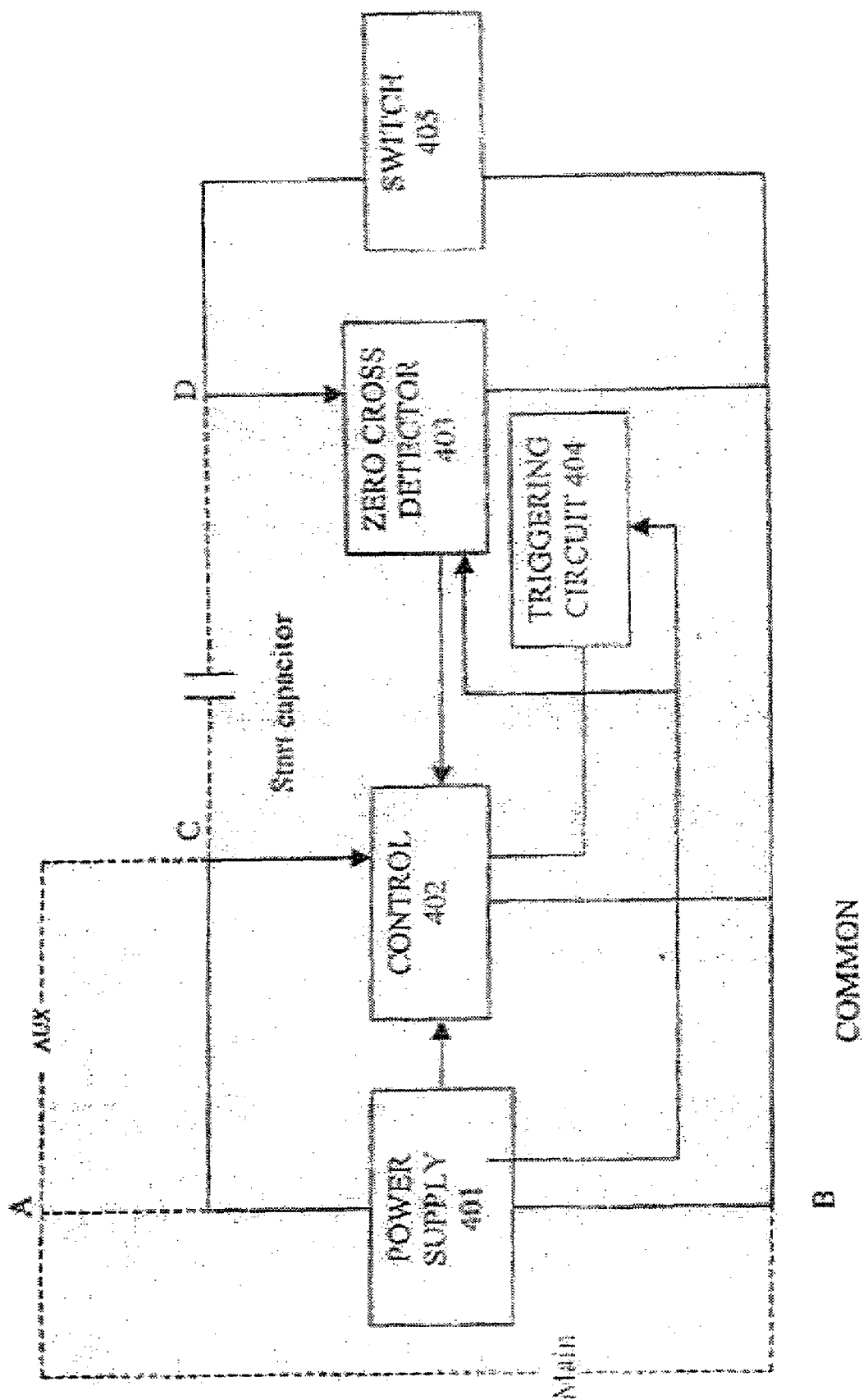
FIG. 2 illustrates a block diagram of said switching system with reference to circuit diagram of FIG. 1.

FIG. 2 shows major components of switching system for controlling the starting of an electrical motor according to the present invention.

The switching system comprising a first winding subsystem or main winding M across (A, B) and a second winding subsystem or auxiliary winding (AUX) across (A, C).

A power supply circuit (401) is connected to main winding (A, B) to supply power to switching system.

The switching system further comprising a control circuit (402) comprising a first control means, a second control means, a third control means, and a time delay hysteresis inducement means as described with the help of FIG. 1 for controlling the starting of an electrical motor.

A zero-crossing detector circuit (403) connected to said control circuit for capacitor charging and discharging, there by increasing the life of the capacitor and reducing the current spikes and therefore reducing electromagnetic emission.

A triggering circuit (404) coupled to the control circuit (402) for triggering a regulating device to thereby for triggering a regulating device to thereby generate an output for facilitating the commencement and completion of the start operation of said electrical motor.

A electronic switch (405) is connected to the controller circuit for commencement and completion of the start operation of said electrical motor.

It recognized that various equivalents, alternatives and modifications are possible within the scope of the appended claims.

We claim:

1. A switching system for controlling the starting of an electrical motor comprising:
    a first winding subsystem (M) for generating a first voltage signal;
    a second winding subsystem (AUX) for generating a second voltage signal and getting deactivated after the attainment of starting speed by said electrical motor;
    a first control means (I1, I2, C2, R3, C1, R5, U1, D1, C3, R8) receiving said first and second voltage signal for computing the resultant of said first and second voltage signal to thereby produce at least two pulse signals corresponding to said resultant and to generate a first enabling signal to incorporate a delay in deactivation of said second winding subsystem, said delay corresponding to the configuration of said first control means;
    a charge storage means (C5) coupled to said second winding subsystem responsive to the additional phase shift generated by second winding subsystem;
    a signal detection means (I6, C6) for generating a second enabling signal;
    a second control means (U3, U4) for generating an output signal responsive to said first and second enabling signals;
    a third control means (I3, C4, I4, R11, R10, D5, R12) coupled to said second control means for generating a triggering signal;
    a triggering means (R16, C7, T1) coupled to said third control means for triggering a regulating device to thereby generate an output for facilitating the commencement and completion of the start operation of said electrical motor;
    a time delayed hysteresis inducement means (R9, C8, I5) responsive to the output signal for establishing a threshold value corresponding to the commencement and completion of the start operation, aid threshold value being established to overcome redundancy caused due to hysteresis; and
    a power supply means (T2, C9, Z4) coupled to said first winding subsystem for generating power for said switching system.

2. A switching system for controlling the starting of an electrical motor as claimed in claim 1, wherein said first winding subsystem is main winding (M) and second winding subsystem is auxiliary winding (AUX) of the electrical motor.

3. A switching system for controlling the starting of an electrical motor as claimed in claim 1, wherein said first control means comprising:
    at least two logic inverters (I1, I2);
    at least two timing circuits (C2, R3 and C1, R5), each coupled to the output of said logic inverters for generating two pulse signals;
    a logic gate (U1) for generating a first enabling signal responsive to said pulse signals; and
    a controlled signal generation circuit to incorporate a delay in deactivation of said second winding subsystem.

4. A switching system for controlling the starting of an electrical motor as claimed in claim 3, wherein said controlled signal generation circuit comprising:
    a diode (D1) coupled to the output of said logic gate;
    a resistor-capacitor circuit (C3, R8) coupled to the output of said diode.

5. A switching system for controlling the starting of an electrical motor as claimed in claim 1, wherein said charge storage device is a start capacitor(C5) for the electrical motor.

6. A switching system for controlling the starting of an electrical motor as claimed in claim 1, wherein said signal detection means is a zero-crossing detector circuit (I6, C6).

7. A switching system for controlling the starting of an electrical motor as claimed in claim 1, wherein said second control means comprising:
    a digital latch (U3, U4); and
    a diode coupled to said digital latch.

8. A switching system for controlling the starting of an electrical motor as claimed in claim 1, wherein said third control means is a free running oscillator (I3, C4, I4, R11, R10, D5, R12).

9. A switching system for controlling the starting of an electrical motor as claimed in claim 1, wherein said triggering means comprising:
    a resistive-capacitive circuit (R16, C7); and
    a transistor (T1) coupled to said resistive-capacitive circuit.

10. A switching system for controlling the starting of an electrical motor as claimed in claim 1, wherein said regulating means is a triac(TR).

11. A switching system for controlling the starting of an electrical motor as claimed in claim 1, wherein said time delayed hysteresis inducement means comprising:
    a capacitor, and
    a logic inverter (I5) coupled to said capacitor.

12. A switching system for controlling the starting of an electrical motor as claimed in claim 1, wherein said power supply means comprising:
    a biasing circuit;
    a transistor (T2) coupled to said biasing circuit;
    a capacitor (C9) connected in parallel to said biasing circuit; and
    a zener diode (Z4) connected in parallel to said capacitor.

* * * * *